United States Patent [19]

Hoffman

[11] 4,034,257

[45] July 5, 1977

[54] MERCURY VAPOR LAMP UTILIZING A COMBINATION OF PHOSPHOR MATERIALS

[75] Inventor: Mary V. Hoffman, South Euclid, Ohio

[73] Assignee: General Electric Company, Schenectady, N.Y.

[22] Filed: June 5, 1975

[21] Appl. No.: 583,959

[52] U.S. Cl. .................... 313/487; 252/301.4 R; 313/468
[51] Int. Cl.² ........................................ H01J 1/62
[58] Field of Search ............. 252/301.4 R; 313/468, 313/485, 486, 487

[56] References Cited

UNITED STATES PATENTS

| | | | |
|---|---|---|---|
| 2,748,306 | 5/1956 | Bjorkman | 313/485 |
| 3,360,674 | 12/1967 | Mikus et al. | 313/485 X |
| 3,504,819 | 4/1970 | Veres | 313/485 X |
| 3,564,322 | 2/1971 | Blasse et al. | 313/468 X |
| 3,569,762 | 3/1971 | Levine | 313/486 |

Primary Examiner—Rudolph V. Rolinec
Assistant Examiner—Lawrence J. Dahl
Attorney, Agent, or Firm—John F. McDevitt; Lawrence R. Kempton; Frank L. Neuhauser

[57] ABSTRACT

Color correction is provided in a high-pressure mercury vapor discharge lamp with a particular combination of two different phosphor materials producing an efficient composite emission. A blend of said phospor materials can improve color rendition without effecting any significant reduction in the lamp lumen output.

16 Claims, 2 Drawing Figures

MERCURY VAPOR LAMP UTILIZING A COMBINATION OF PHOSPHOR MATERIALS

BACKGROUND OF THE INVENTION

1. Field of the Invention

This invention relates generally to a high-pressure mercury vapor discharge lamp coated with a particular phosphor blend to improve the emission color response when excited by the ultraviolet radiation generated from the mercury vapor discharge. More particularly, an improvement is provided in the combined lamp lumen output and color rendering index compared with conventional lamps utilizing either a phosphor coating of europium-activated yttrium vanadate phosphate phosphor alone or with other known color-correcting phosphor additives.

2. Description of the Prior Art

The arc discharge in a high-pressure mercury vapor lamp (HPMV) produces lines of varying energy in the ultraviolet, blue and yellow portions of the spectrum. Major radiations occur at 405, 436, 546, and 578 nanometer (nm.) in the visible spectrum, and also at 254, 296, and 365 in the ultraviolet. Because of the lack of radiation in the red (about 600 nm.) region of the color spectrum, the high-pressure mercury lamp emits a bluish light. This absence of red causes most color objects to appear distorted in color values. The red-deficiency in color rendition of HPMV lamps are much improved by covering the inside of the outer envelope with a red emitting phosphor excited by the ultraviolet energy generated by the mercury arc. The red phosphors commonly used in HPMV lamps are tin (stannous $Sn^{2+}$) activated strontium orthophosphate (U.S. Pat. No. 3,110,680, Koelmans et al, June, 1957) and manganese-activated magnesium fluorogermanate (U.S. Pat. No. 2,748,303, Thorington, May, 1956). More recently, europium-($Eu^{3+}$) activated yttrium vanadate and europium-activated yttrium vanadate phosphate phosphor (T. W. Luscher and R. K. Datta, *Illuminating Engineering*, Vol. 65, No. 1, Jan., 1970, pgs. 49–53) have found extensive use in high-pressure mercury vapor lamps. These phosphors emit in the red portion (about 600–650 nm.) of the color spectrum, thus producing a color-corrected mercury vapor discharge lamp but at $x$ and $y$ chromaticity values too far removed from the black body locus line. In a recent lamp development, the color correction is provided with a blend of yttrium vanadate phosphor or yttrium vanadate phosphate phospher containing magnesium fluorogermanate or magnesium arsenate and which is deposited as a layer upon a non-luminescent underlayer of silica, titania, magnesia, or alumina. This composite coating is said to provide color rendition similar to that of an incandescent lamp at high efficiency.

Utilization of cerium-activated yttrium aluminate phosphor as the only luminescent coating for HPMV lamps is also known as described in German Pat. No. 2,250,231. In said embodiment, the phosphor emission response to 436 nm. excitation from the mercury arc discharge has maximum intensity at about 5,420 Angstrom wave length with a half width of approximately 100 Angstroms and was further characterized as having a satisfactory temperature dependence. The chemical composition of said phosphor material is reported to have a ratio of yttrium oxide to aluminum oxide in the range from 1:5/3 to 1:3 with the cerium level ranging from 0.1 to 7.5 weight percent of the total weight of yttrium and aluminum oxides. Said phosphor material was also reported to have been prepared by firing the oxide mixture or source compounds for the essential metal ions utilizing an ammonium chloride flux.

SUMMARY OF THE INVENTION

It has now been discovered, surprisingly, that a cerium-activated yttrium aluminate phosphor material can be blended in particular proportions with the conventional red-emitting phosphors customarily employed in HPMV lamps (such as europium-activated yttrium vanadate and europium-activated yttrium vanadate phosphate) to improve the color rendition without significant reduction in the lamp lumen output. The present color-correcting phosphor additive is efficiently excited in its main absorption band at the 420–460 nm. region of the visible spectrum thereby absorbing part of the 436 nm. Hg line, as is necessary to improve the color rendering index. The emission in the yellow-green spectrum of the present phosphor additive corresponds to the maximum eye-sensitivity region, thereby contributing to the lumen output of the HPMV lamp coated with this particular phosphor blend. The particular class of cerium-activated yttrium aluminate phosphor additives providing such composite emission response are known as previously indicated and can be identified by the general formula:

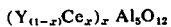
$$(Y_{(1-x)}Ce_x)_x Al_5O_{12}$$

with $x$ having an approximate value in the range of 0.004 to 0.020. Said response is obtained with an admixture containing from a small but effective amount up to approximately 30 weight percent of the phosphor additive in the phosphor blend with a red-emitting phosphor. The particular phosphor selection and proportions can be established in a routine manner from the predetermined visible spectral energy distribution desired. For example, a particularly preferred admixture utilizes europium-activated yttrium aluminate phosphor wherein the cerium activator level is in the range 0.004 to 0.010 to provide an improved color rendering index and lamp lumen output at desired $x$ and $y$ chromaticity values adjacent to the well-known black body locus line. The color-rendering index values reported herein are those measured by the generally accepted C.I.E. method. Correspondingly, the $x$ and $y$ chromaticity values hereinafter reported in the present specification were also obtained in accordance with the accepted C.I.E. method.

In one of its aspects, the presently improved mercury vapor lamp constructions include an ultraviolet reflecting underlayer of alumina particles which may further improve the color rendering index without any significant reduction in the lamp lumen output. The alumina material comprises vapor-formed spherical alumina particles having an individual particle size range of approximately 400 Angstroms to 5,000 Angstroms in diameter and with said underlayer scattering at least 99 percent of the incident radiation with minor lumen loss when deposited directly on the clear internal surface of the outer glass envelope. The same type alumina underlayer along with method for deposition in HPMV lamp constructions is already described in U.S. patent application Ser. No. 583,961, filed June 5, 1975, concurrently with the present application in the names of J. M. Maloney and R. E. Clark and assigned to the assignee of the present invention. Consequently, said modification need not be further described in the present application except insofar as pertains to the light emission behavior of the HPMV lamps incorporating said vapor-deposited alumina underlayer in combination with the present phosphor blends.

DESCRIPTION OF THE PREFERRED EMBODIMENTS

Figure 1:
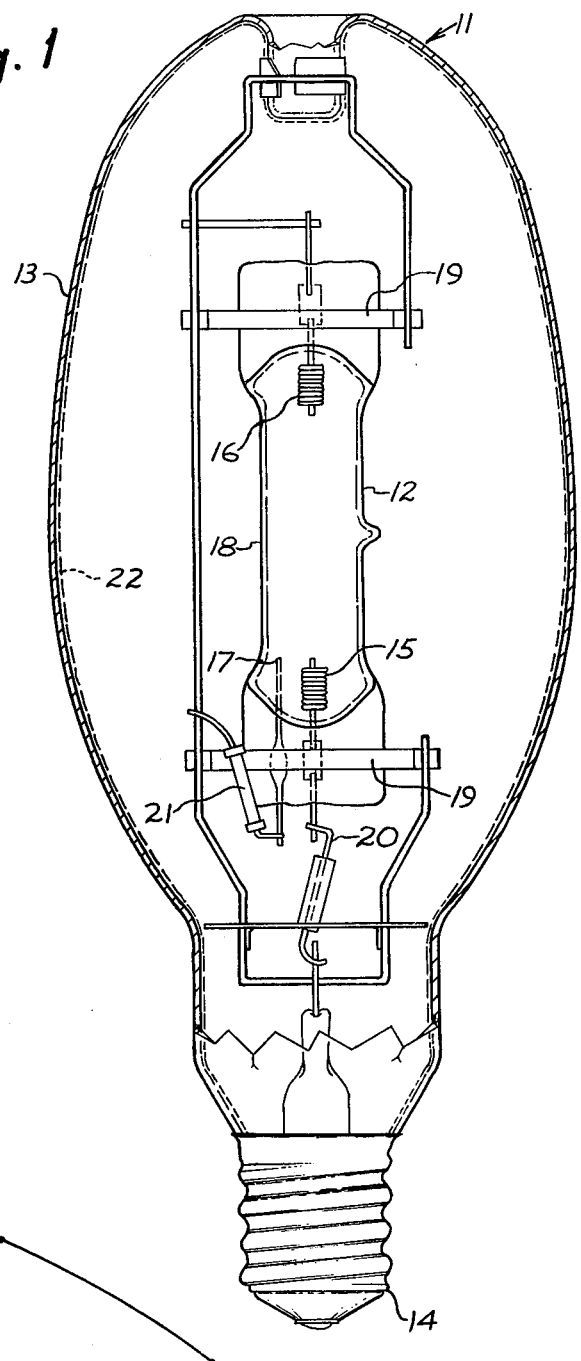
FIG. 1 illustrates a high-pressure mercury vapor discharge lamp containing a single phosphor coating in accordance with the present invention.

Starting materials for the oxide and activator constituents in the present color-correcting phosphor additives may consist of the oxides directly or any salt of the essential metal ions which can be converted upon heating to the oxides. Thus, it is contemplated to employ starting materials in the form of homogeneous mixtures or coprecipitated slurries of the essential metal ions such as the oxides, oxalates or hydroxides and which can further contain the activator element in preparing the final phosphor additive material. As can be further noted from the following examples given for illustration of the preferred embodiments, an excess of the alumina constituent in the final phosphor does not appear to have any detrimental effect in providing the desired improvements. It has been discovered, however, that the firing conditions of final phosphor preparation can influence the brightness of the emission response in the present HPMV lamp application. Consequently, it will be desirable to conduct the final phosphor firing at about 1,000° C or greater in a neutral or slightly reducing atmosphere such as nitrogen or nitrogen containing approximately 1 percent hydrogen or a mixture of CO and $CO_2$ respectively. Such firing schedule has been found to increase the emission response by as much as 15 to 50 percent depending upon the particular cerium activator level.

The following examples are provided to illustrate preferred methods of preparing the present phosphor additives as well as the lamp test results obtained therewith.

EXAMPLE 1

A phosphor additive having a general formula $(Y_{0.99}Ce_{0.01})_3Al_5O_{12}$ was prepared by carrying out the following procedure. A coprecipitation of the cerium activator in yttrium oxide was preferred to insure good mixing of the starting materials. To form $(Y_{0.99}Ce_{0.01})_2O_3)$ 100 grams of $Y_2O_3$ and 3.89 grams of $Ce(NO_3)_3 \cdot 6H_2O$ were dissolved in an aqueous solution with $HNO_3$. The oxalate was precipitated with a solution of oxalic acid prepared from dissolving 200 grams of oxalic acid in water. The precipitated oxalate was then dried and fired at about 1,000° C in air for several hours to decompose and form the oxide. To form the phosphor, 100 grams of said $(Y_{0.99}Ce_{0.01})_2O_3$ oxide product were mixed with 189.8 grams of $Al_2O_3 \cdot 3H_2O$ and 14.5 grams of $NH_4Cl$ flux. The admixture was fired at approximately 1,250°–1,300° C for 4 hours in air. The product was thereupon reblended with an additional 14.5 grams ammonium chloride flux and refired in covered trays utilizing the same initial firing schedule. Further grinding and refiring of the phosphor mixture was carried out employing a 1,600° C firing temperature for approximately 5 hours in air. After grinding, a final firing step was carried out at 1,000° C in nitrogen for 1 to 2 hours with 1 percent $H_2$ to produce a phosphor having the chemical formula above defined which further contained 1.1 moles excess alumina.

EXAMPLE 2

An alternative method of phosphor preparation can be employed to provide the same phosphor composition obtained in the preceding example but not containing excess alumina. Accordingly, 22.3 grams yttrium oxide was dissolved in water along with 0.868 grams $Ce(NO_3)_3 \cdot 6H_2O$ and 126 grams $Al(NO_3)_3 \cdot 9H_2O$ utilizing a suitable mineral acid such as hydrochloric acid or nitric acid. A hydroxide precipitate was obtained from said solution by adding ammonium hydroxide until the precipitation was completed, at a pH of approximately 6 or greater. The hydroxide precipitation was then filtered, dried, and fired at 600° C in air for 1 to 2 hours to form the desired oxide mixture. Said mixture was then ball-milled and fired at approximately 1,600° C for 5 hours in air and the phosphor mixture refired at 1,000° C for 1 to 2 hours in nitrogen with 1 percent $H_2$ to form an essentially stoichiometric phosphor product.

In the following Table I, there is shown lamp test results for otherwise conventional 400-watt size HPMV lamps utilizing various weight percents of the additive phosphor in accordance with the present invention as prepared by Example 1. Said lamp test results include comparison with the conventional lamp wherein a phosphor coating of europium-activated yttrium vanadate phosphate phosphor material only was employed as well as a comparison with lamps including the vapor-deposited alumina underlayer in combination with both type phosphor coatings.

Table I

| Weight Percent $(Y_{.99}Ce_{.01})_3$ $Al_5O_{12}$ | Coating Weight (GMS./Bulb) | | Lumen Output (Lumens per watt) | Color Rendering Index | Emission Color | |
|---|---|---|---|---|---|---|
| | | | | | X | Y |
| 0 | 3.6 | (1) | 52.06 | 40.7 | .407 | .384 |
| 5 | " | (1) | 51.8 | 42.5 | .4095 | .3935 |
| 10 | " | (1) | 50.0 | 49.7 | .4195 | .4045 |
| 15 | " | (1) | 51.1 | 49.2 | .424 | .4125 |
| 0 | 3.6 | | 51.5 | — | .403 | .383 |
| 5 | " | | 52.4 | — | .4055 | .3895 |
| 10 | " | | 53.6 | — | .4115 | .398 |
| 15 | " | | 53.2 | — | .4165 | .4045 |
| 0 | 2.4 | (1) | 56.0 | — | .4015 | .3825 |
| 5 | " | (1) | 57.35 | — | .4035 | .389 |
| 10 | " | (1) | 56.05 | — | .409 | .3945 |
| 15 | " | (1) | 55.9 | — | .4055 | .3945 |
| 0 | 2.4 | | 57.1 | 34.3 | .3975 | .380 |

Table I-continued

| Weight Percent $(Y_{.99}Ce_{.01})_3 Al_5O_{12}$ | Coating Weight (GMS./Bulb) | Lumen Output (Lumens per watt) | Color Rendering Index | Emission Color X | Y |
|---|---|---|---|---|---|
| 5 | " | 56.1 | 42.7 | .4015 | .3855 |
| 10 | " | 54.45 | 48.7 | .404 | .390 |
| 15 | " | 5.64 | 47.1 | .410 | .396 |

(1)Included vapor-deposited alumina underlayer

It can be noted from this lamp test that the incorporation of $(Y_{0.99}Ce_{0.01})_3 Al_5O_{12}$ additive results in a color shift with increasing values of $x$ and $y$. This shift causes the lamp color to move from below the black body locus line to close to or above the locus, resulting in an improvement in color rendering index and a desirable decrease in the lamp color temperature. The lamp lumen level is maintained or improved with the incorporation of the additive. The quoted color rendering index values were measured from spectral distribution curves made at 1 hour burning time.

Referring to FIG. 1, there is shown a high-pressure mercury vapor lamp 11 comprising a quartz arc tube 12 enclosed within a vitreous outer jacket or lamp glass envelope 13 provided with a screw base 14. The arc tube is provided with main electrodes 15 and 16 at each end with an auxiliary electrode 17 being located adjacent main electrode 15. The discharge-sustaining filling in said arc tube comprises a measured amount of mercury which is completely vaporized during operation in combination with an inert starting gas such as argon, all of which is conventional in such lamps. The arc tube is supported within the outer jacket by a frame or harp comprising a single side rod 18 and metal straps 19. The frame also serves as a conductor between electrode 16 and the base shell. Another conductor 20 connects the other electrode 15 to the center contact of the base. Starting electrode 17 is connected to main electrode 16 at the opposite end of the arc tube by a current limiting resistor 21 in already known fashion. A phosphor coating 22 in accordance with the present invention is applied utilizing conventional methods of application from a liquid suspension of the phosphor particles. Said phosphor coating can be applied over the vapor-deposited alumina reflecting underlayer (not shown) in further accordance with a preferred embodiment of the present invention.

Figure 2:
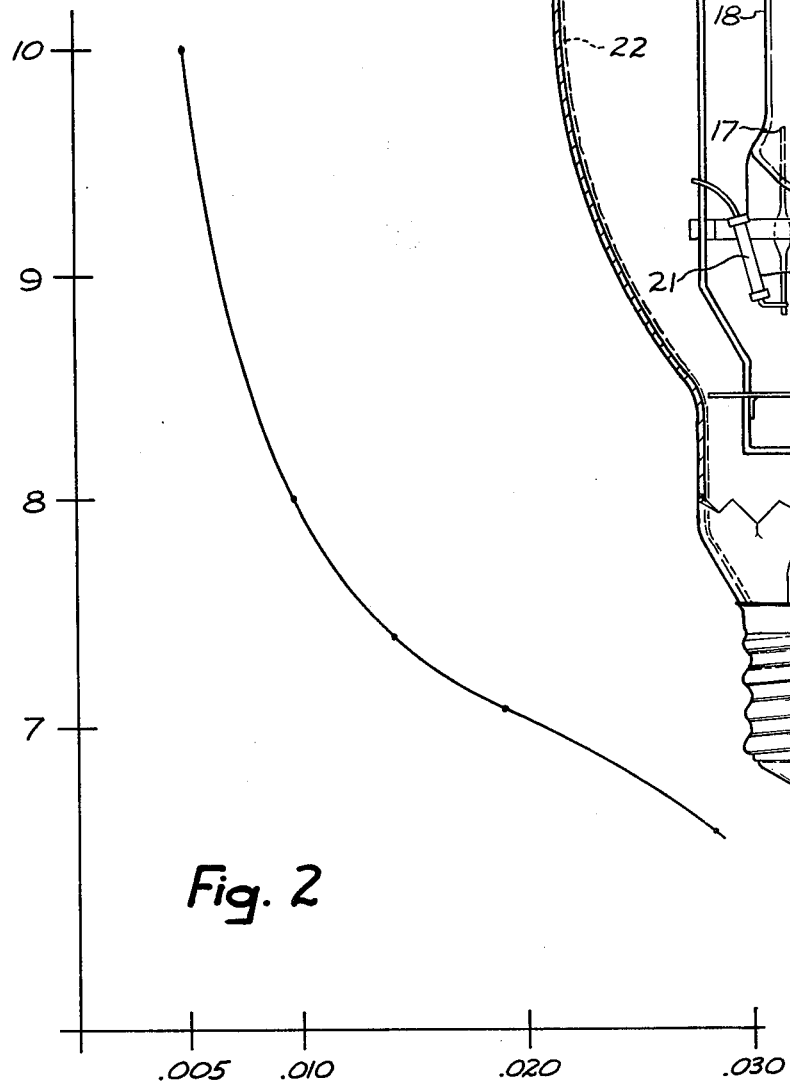
FIG. 2 is a graph depicting the relationship between the cerium activator level in the present color-correcting phosphor additives with respect to peak spectral emission response of said phosphor additives at elevated temperatures of lamp operation.

The effect of cerium activator level in $(Y_{1-x}Ce_x)_3 Al_5O_{12}$ upon the emission intensity at 300° C of the present color-correcting phosphor additive is shown in FIG. 2. The particular phosphor emission response measured to calculate said values was peak emission obtained when the phosphor materials were heated to 300° C and excited with 436 nm. radiation. It can be seen from the reported values obtained in this manner that an optimum cerium concentration at $x=0.005$ produces the highest peak emission at the 300° C operating temperatures ordinarily encountered in HPMV lamp operation.

It will be apparent from the foregoing description that a generally useful color-correcting phosphor additive has been provided for HPMV lamps. It will be apparent that modifications can be made in the preferred methods above described for preparation of said phosphor additive as well as in substitution of different red-emitting phosphor without departing from the true spirit and scope of this invention. Consequently, it is intended to limit the present invention only by the scope of the appended claims.

What I claim as new and desire to secure by Letters Patent of the United States is:

1. In a high-pressure mercury vapor lamp comprising an inner discharge assembly including an arc tube containing a filling of mercury, a transparent outer envelope surrounding said discharge assembly and spaced therefrom, and a phosphor coating deposited on the inner surface of said outer envelope, the improvement which comprises using a phosphor blend of a red-emitting phosphor selected from the group consisting of europium-activated yttrium vanadate and europium-activated yttrium vanadate phosphate with up to about 30 weight percent in said phosphor blend of cerium-activated yttrium aluminate phosphor so as to absorb at least part of the 436 nanometer emission generated by the mercury arc discharge.

2. A lamp as in claim 1 wherein the cerium-activated yttrium aluminate phosphor has the general formula:

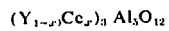

$$(Y_{1-x}Ce_x)_3 Al_5O_{12}$$

with $x$ having an approximate value in the range 0.004 to 0.020.

3. A lamp as in claim 2 wherein $x$ has an approximate value in the range 0.004 to 0.005.

4. A lamp as in claim 2 wherein the weight percent of the cerium-activated yttrium aluminate phosphor in the phosphor blend is in the approximate range 5–30.

5. A lamp as in claim 1 wherein the phosphor blend is a mixture of said cerium-activated yttrium aluminate phosphor with europium-activated yttrium vanadate phosphate phosphor.

6. A lamp as in claim 1 wherein the color rendering index has been increased without significant reduction in the lamp lumen output.

7. A lamp as in claim 1 wherein the arc tube contains a pair of spaced apart principal electrodes and an auxiliary electrode disposed adjacent one of said principal electrodes.

8. In a high-pressure mercury vapor lamp comprising an inner discharge assembly including an arc tube having a pair of spaced apart principal electrodes and an auxiliary electrode disposed adjacent one of said principal electrodes, a filling of mercury and inert gas within said arc tube, a transparent other envelope surrounding said discharge assembly and spaced apart therefrom, and a phosphor coating deposited on the inner surface of said outer envelope, the improvement which comprises using a phosphor blend to improve the color rendering index without significant reduction in the lamp lumen output, said phosphor blend comprising a mixture of europium-activated yttrium vanadate phosphate phosphor and approximately 5–30 weight percent of a cerium-activated yttrium aluminate phosphor having the general formula:

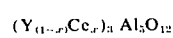

$$(Y_{1-x}Ce_x)_3 Al_5O_{12}$$

with $x$ having an approximate value in the range 0.004 to 0.020 so as to absorb at least part of the 436 nanometer emission generated by the mercury arc discharge.

9. A lamp as in claim 8 wherein the cerium-activated yttrium aluminate phosphor further contains excess alumina.

10. In a high-pressure mercury vapor lamp comprising an inner discharge assembly including an arc tube containing a filling of mercury, a transport outer glass envelope surrounding said discharge assembly and spaced therefrom, and a phosphor coating deposited on the inner surface of said outer envelope, the improvement which comprises having a phosphor blend layer of a red-emitting phosphor with up to about 30 weight percent in said phosphor blend of cerium-activated yttrium aluminate phosphor so as to absorb at least part of the 436 nanometer emission generated by the mercury arc discharge overlying an alumina ultraviolet reflecting underlayer, said alumina underlayer comprising vapor-formed spherical alumina particles having an individual particle size range from approximately 400 Angstroms to 5,000 Angstroms in diameter and said underlayer scattering at least 99 percent of the incident radiation with minor lumen loss when deposited directly upon the clear internal surface of the outer glass envelope.

11. A lamp as in claim 10 wherein the alumina underlayer has a thickness providing selective ultraviolet reflection without significantly reducing visible transmission.

12. A lamp as in claim 10 wherein the cerium-activated yttrium aluminate phosphor has a general formula:

$$(Y_{(1-x)}Ce_x)_3 Al_5O_{12}$$

ps with $x$ having approximate value in the range 0.004 to 0.020.

13. A lamp as in claim 12 wherein $x$ has an approximate value in the range 0.004 to 0.005.

14. A lamp as in claim 10 wherein the weight percent of the cerium-activated yttrium aluminate phosphor is in the approximate range 5–30.

15. A lamp as in claim 10 wherein the phosphor blend is a mixture of said cerium-activated yttrium aluminate phosphor with europium-activated yttrium vanadate phosphate phosphor.

16. A lamp as in claim 10 wherein the color rendering index has been increased without significant reduction in the lamp lumen output.

* * * * *